United States Patent [19]

Wiegenstein

[11] Patent Number: 4,715,203

[45] Date of Patent: Dec. 29, 1987

[54] COLD-WORKING TOOL

[75] Inventor: John H. Wiegenstein, Bellevue, Wash.

[73] Assignee: The Boeing Company, Seattle, Wash.

[21] Appl. No.: 798,001

[22] Filed: Nov. 14, 1985

[51] Int. Cl.⁴ .............................................. B30B 15/00
[52] U.S. Cl. .................................... 72/30; 72/453.16; 173/169
[58] Field of Search ............... 173/116, 169, 170, 128; 72/30, 391, 392, 453.16, 453.17; 29/243.52, 243.53

[56] References Cited

U.S. PATENT DOCUMENTS

| | | |
|---|---|---|
| 2,185,483 | 1/1940 | Ward . |
| 3,078,905 | 2/1963 | Somers et al. . |
| 3,218,838 | 11/1965 | Beckwell . |
| 3,270,410 | 9/1966 | Salter et al. . |
| 3,434,327 | 3/1969 | Speakman . |
| 3,451,248 | 6/1969 | Bell . |
| 3,468,152 | 9/1969 | Croseck et al. . |
| 3,523,441 | 8/1970 | Bell et al. . |
| 3,566,662 | 3/1971 | Champoux . |
| 3,616,673 | 11/1971 | Miklos ......................... 72/453.17 X |
| 3,738,146 | 6/1973 | Gunn . |
| 3,805,578 | 4/1974 | King, Jr. . |
| 3,812,704 | 5/1974 | Kowal . |
| 4,088,003 | 5/1978 | Schwab . |
| 4,187,708 | 2/1980 | Champoux ............................. 72/30 |
| 4,310,056 | 1/1982 | Olsson ................................. 173/169 |
| 4,493,205 | 1/1985 | Ramey . |
| 4,580,435 | 4/1986 | Port et al. ..................... 72/453.17 X |

Primary Examiner—E. R. Kazenske
Assistant Examiner—William Fridie, Jr.
Attorney, Agent, or Firm—Christensen, O'Connor, Johnson & Kindness

[57] ABSTRACT

A cold-working tool for thrusting an attached mandrel (14) partially through a hole in a metal workpiece and extracting the mandrel from the hole is disclosed. The tool comprises a pneumatic riveting gun (12) that has a body (21), a handle portion (22), and an elongate barrel (24). A boss (30) is slidably retained within the outer end of the barrel. The mandrel is attached to the outermost end of the boss. The mandrel has an enlarged diameter portion (38). The riveting gun is connected to a source of pressurized air so that the impulsive forces generated by the riveting gun are transmitted through the boss to the mandrel for thrusting the mandrel through the hole. The tool also includes a housing (56) that substantially encloses the body and barrel of the gun, the housing has a forward end and a rearward end. A nose cap (72) is attached to the forward end of the housing to substantially enclose the boss with the mandrel projecting through a hole in the nose cap. A piston and cylinder assembly (18) is attached to the rearward end of the housing. The piston and cylinder assembly includes a piston (68) and protruding piston rod (70) having an outermost end attached to the body of the gun. The mandrel is extracted from the hole by positioning the housing and attached nose cap between the cylinder (62) of the piston and cylinder assembly and the metal member and then introducing pressurized fluid into the cylinder so that the piston will forcibly pull the gun away from the metal workpiece to extarct the attached mandrel therefrom. The tool also includes an operating system that causes the tool to alternately thrust the mandrel through the hole and extract it therefrom.

10 Claims, 4 Drawing Figures

Fig.3.

COLD-WORKING TOOL

TECHNICAL AREA

This invention relates to cold-working of metal, and particularly to a tool for cold-working the region surrounding a hole in a metal workpiece.

BACKGROUND OF THE INVENTION

The assembly of some metal structures such as airplane wings includes fastening several components of the structure together with rivets or similar fasteners. Prior to assembly, a multitude of fastener holes are formed in the components. As is well known in the art, holes or other discontinuities in a structure lead to localized stress concentrations near the hole when the structure is loaded. These stress concentrations can lead to early fatigue failure of the structure. The fatigue life of the structure can be greatly improved if the material surrounding a fastener hole is strain hardened through a process known as cold-working. Cold-working is the process of plastically deforming the material around the hole at a temperature below its annealing point in order to increase is hardness and tensile strength.

Cold-working the metal that surrounds fastener holes can be performed in a variety of ways. One method involves lining the hole with a sleeve and pulling a shaft having an enlarged diameter portion (commonly referred to as a mandrel) through the hole to radially expand the hole and achieve the desired strain hardening of the metal. Specifically, a longitudinally split annular metal sleeve is slid onto the mandrel over its enlarged diameter portion. The enlarged diameter portion of the mandrel, which is slightly smaller than the hole, is then passed through the hole. Next, the sleeve is slid along the mandrel into position within the hole. The sleeve has an inside diameter that is smaller than the enlarged diameter portion of the mandrel. With the sleeve held in place within the hole, the mandrel is then forcibly withdrawn through the hole by a suitable pulling mechanism so that the enlarged diameter portion of the mandrel forces radial expansion of the sleeve and hole as it passes through. The desired strain hardening is created by the forced expansion of the hole compressing the region surrounding the periphery of the hole. The sleeve is then removed from the hole and discarded before the fastener is installed. Champoux, U.S. Pat. No. 4,187,708, discloses an apparatus and method for performing this type of cold-working.

At least three problmes arise when sleeves are employed in a cold-working process. Firstly, the metal sleeves, which are typically formed of stainless steel, can only be used once and are therefore costly to supply in large numbers. Secondly, since the sleeves must be split to fit over the enlarged diameter portion of the mandrel, the forced radial expansion of the split sleeve within the hole results in a protruding ridge formed in the hole that must be removed by reaming before a fastener can be inserted. Thirdly, the sleeve itself undergoes some compression during the cold-working process. Thus, not all of the compressive force developed by pulling the mandrel through the hole is applied to compressing (i.e., strain hardening) the material surrounding the hole.

One alternative to cold-working with sleeves includes inserting a multipart collapsible mandrel in collapsed form through a hole, and mechanically expanding the mandrel. The expanded mandrel is then pulled back through the hole to compress the region surrounding it. Two disadvantages of this technique are that collapsible mandrels are expensive to build and do not have the strength of solid mandrels. Furthermore, when expanded, the gaps between the parts of a multipart mandrel leave ridges in the periphery of a hole as the mandrel is drawn through the hole. These ridges must be removed by reaming before a fastener can be inserted. When reaming exposed ridges, it is practically impossible to avoid simultaneous removal of a portion of the hole's sidewall. It is this portion of the metal that is closest to the hole that receives the greatest amount of compression (hence, produces the greatest fatigue resistance) and preferably should not be removed.

In order to avoid the use of sleeves or collapsible mandrels with their attendant problems, solid mandrels having enlarged diameter portions that are larger than the hole have been employed in the past. The solid mandrels are unattached to any push or pull mechanisms and are forced completely through the hole with suitable driving means such as a pneumatic hammer. However, such a process requires substantial clearance and access on each side of the hole in order to retrieve the mandrel. Such access is difficult to obtain in many airplane wing portions. Furthermore, even if access is available, retrieval of the mandrel each time a hole is cold-worked increases labor costs.

Regardless of whether sleeved or multipart mandrels are employed in the cold-working process, the mandrel will typically leave an annular protrusion of metal around the edge of the hole on the side of the workpiece from which the mandrel exits the hole. Such a protrusion is also found when a solid mandrel is forced completely through the hole in one direction. In most cases, this protrusion must be removed before the fastener is inserted.

SUMMARY OF THE INVENTION

In accordance with this invention, a cold-working tool for both thrusting an attached mandrel partially through a hole in a metal workpiece and extracting the mandrel from the hole is provided. The mandrel employed is a single, solid piece having an enlarged portion with a diameter greater than that of the hole. Only the enlarged portion of the mandrel is thrust through the hole and then pulled back. During the process, the mandrel remains attached to the tool.

A cold-working tool formed in accordance with this invention comprises a gun having a body, handle portion, and an elongate barrel. A boss having an inner end and an outer end is connected to the barrel such that the inner end of the boss is longitudinally slidable within the outer end of the barrel. The mandrel is attached to the outer end of the boss. A pneumatic impact system connected to the gun applies impulse forces to the boss that thrust the enlarged portion of the attached mandrel through the hole. Because of the elasticity of the metal, the hole will contract somewhat after the enlarged portion of the mandrel passes through; therefore, the mandrel must be forcibly extracted from the hole.

In accordance with this invention, the mechanism for extracting the mandrel includes a hydraulic piston and cylinder assembly that is connected to the gun to apply a pulling force to the gun that results in the extraction of the mandrel from the hole. Specifically, the gun body is enclosed within a housing that has one end connected to the piston and cylinder assembly and the other end projecting outwardly beyond the boss. The forward end of the housing is positionable against the metal workpiece to brace the piston and cylinder assembly against the workpiece with the gun between the piston and cylinder assembly and the workpiece. The piston and cylinder assembly comprises a piston that is slidably movable within a cylinder. A piston rod is attached to the piston and protrudes outwardly from the cylinder. The outer end of the piston rod is connected to the gun. The piston and cylinder assembly and gun are arranged so that when pressurized hydraulic fluid is directed into the cylinder, the piston is moved within the cylinder. The housing, when positioned with its forward end against the workpiece, prevents movement of the cylinder toward the gun when the pressurized fluid is directed into the cylinder. With the cylinder prevented from moving toward the gun, the hydraulically forced movement of the piston within the cylinder will pull the attached gun toward the cylinder, thereby forcibly extracting the attached mandrel from the hole in the workpiece.

As another aspect of this invention, a compact operating system is included for distributing pressurized air and hydraulic fluid as required to operate the tool for thrusting the mandrel through the hole and extracting it therefrom.

The tool formed in accordance with this invention does not require the use of sleeves. The mandrel employed with the present invention is a single solid piece that is permanently attached to the remainder of the tool. The mandrel is only partially thrust through the hole, therefore little access on the other side of the hole is needed and the step of retrieving the mandrel is obviated. The hole that is cold-worked with the tool formed in accordance with this invention has no ridge protruding internally and substantially no residual annular projections around its outer edges.

BRIEF DESCRIPTION OF THE DRAWINGS

The invention, with its attendant advantages, will become better understood from the following detailed description when considered incombination with the accompanying drawings, wherein.

DETAILED DESCRIPTION OF THE PREFERRED EMBODIMENT

Figures 1, 2:
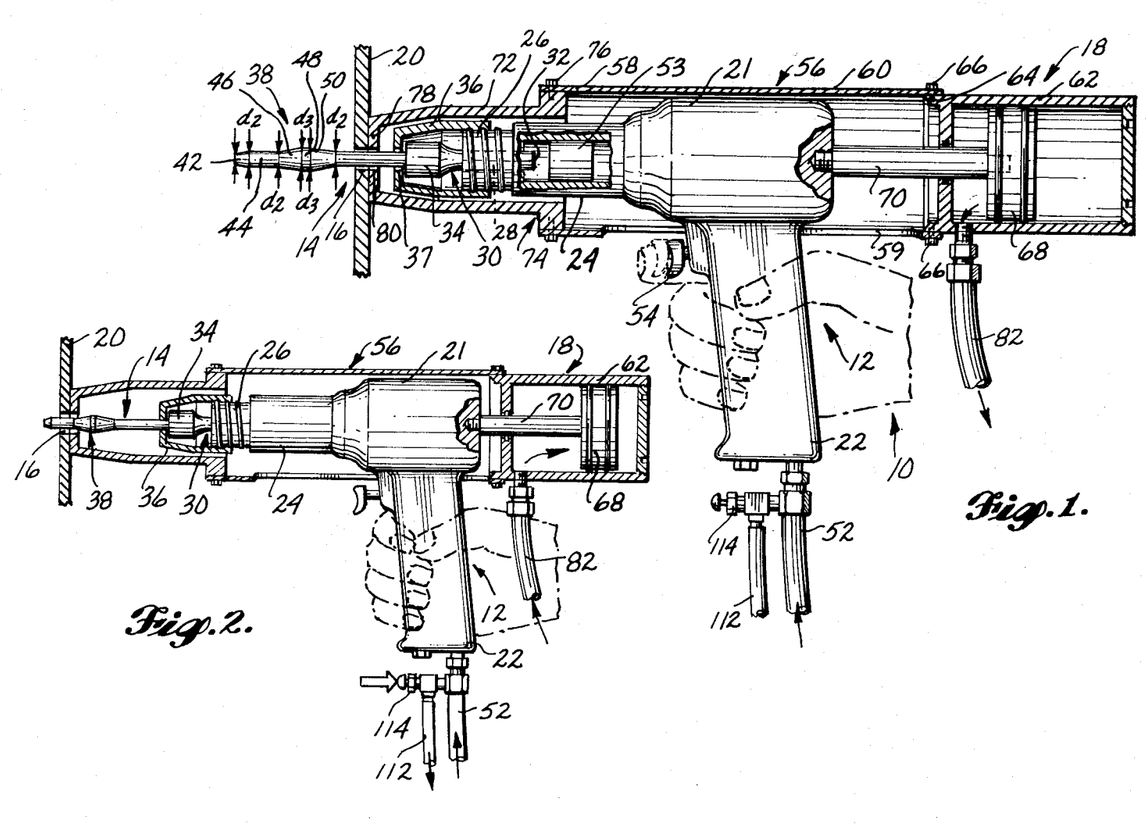
FIG. 1 is a side sectional view of a cold-working tool formed in accordance with this invention showing the tool's configuration after the mandrel is forced through a hole.
FIG. 2 is a side sectional view of the tool of FIG. 1, showing the tool's configuration as the mandrel is withdrawn from the hole.

With reference to FIGS. 1 and 2, a cold-working tool 10, formed in accordance with this invention, generally comprises a pneumatic riveting gun 12 adapted to direct its impulse forces to an attached mandrel 14 for causing an enlarged portion 38 of the mandrel to be thrust forwardly (to the left in the figures) through a hole 16 formed in a metal workpiece 20. The enlarged portion 38 of the mandrel includes a section with a diameter greater than that of the hole 16. When the enlarged portion 38 of the mandrel is thrust through the hole, the metal surrounding the hole is compressively stressed as the hole is enlarged. Because of the elasticity of the metal, the hole will contract slightly after the enlarged portion 38 of the mandel 14 passes through. Hence, the mandrel 14 must be forcibly extracted from the hole. to this end, the tool includes a hydraulic piston and cylinder assembly 18 that is mounted on the rearward end 60 af a rigid tubular housing 56. A piston rod 70 extends outwardly from the piston and cylinder assembly 18. The outermost end of the piston rod 70 is fastened to the gun 12. The housing includes a rigid nose cap 72 fastened to its forward end 58. The mandrel 14 projects through the nose cap. When the nose cap 72 is placed against the workpiece 20 and pressurized hydraulic fluid is introduced into the piston and cylinder assembly 18, the resulting movement of the piston rod 70 forces the gun to extract the attached mandrel from the hole.

The pneumatic riveting gun 2, such as model No-.AVC 12A1, manufactured by Ingersoll-Rand of Liberty Corner, N.J., includes a body 21 with a depending handle 22. A cylindrical barrel 24 protrudes from the body 21. The outer end 26 of the barrel is externally threaded. An axial bore 28 is formed in the outer end 26 of the barrel. When the gun 12 is conventionally used as a riveting gun, a rivet die is slidably received within the gun's bore 28. The rivet die (not shown) has one end that protrudes from the bore for contact with a rivet. A tool formed in accordance with this invention substitutes a boss 30 for a rivet die. The boss 30 has an elongate cylindrical inner end 32 that slides within the bore 28. The boss 30 also has an outer end 34 that has a greater diameter than the inner end 32. The outer end 34 of boss 30 carries the mandrel 14. Specifically, one end of the mandrel 14, which is cylindrically shaped, is seated within a correspondingly-shaped aperture in the outer end 34 of the boss and is fastened thereto by any suitable means, such as induction brazing. The mandrel 14 protrudes outwardly from the boss 30 aligned with the longitudinal axis of the barrel 24 of the gun 12. A retainer cap 36 is threaded onto the outer end 26 of the barrel. The retainer cap secures the boss 30 within the barrel 24. The mandrel 14 protrudes through an aperture 37 formed in the retainer cap 36.

The mandrel 14 has an enlarged portion 38 at its outer end that comprises a number of contiguous sections. Beginning at the outer end of the mandrel, they include: a first tapered section 42 formed in the outer tip of the mandrel whose diameter gradually increase from a minimum outermost diameter $d^1$ to a maximum innermost diameter $d_2$; a pilot section 44 having a constant diameter $d_2$; a second tapered section 46 whose diameter gradually increases from $d_2$ to $d_3$; a major diameter section 48 of constant diameter $d_3$; and a third tapered section 50 whose diameter gradually decreases from $d_3$ to $d_2$. The enlarged portion 38 of the mandrel is sized such that diameter $d_2$ is slightly less than the original, or drilled, diameter $d_h$ of the hole (i.e., before any cold-working). The diameter of the major diameter section 48 ($d_3$) is greater than the diameter $d_h$ of the hole. Since the diameter of the major diameter section is greater than the diameter of the hole, thrusting the enlarged end 38 of the mandrel 14 completely through the hole 16 will radially compress the region of the metal surrounding the hole, thereby strain hardening that region.

Just prior to cold-working, the pilot section 44 of the mandrel is inserted into the hole 16 and the gun 12 is firmly held by the user with the second tapered section 46 bearing upon the outer edge of the hole. The enlarged portion 38 of mandrel 14 is completely thrust through the hole by the impulsive forces directed to the boss 30 by the riveting gun 12. Preferably, the gun 12 is pneumatically operated. Pressurized air is supplied to the gun via a main pneumatic conduit 52 that connects the handle 22 of the gun to a suitable source of compressed air. The operation of the riveting gun 12 is controlled by a trigger 54 actuated by the user. As is well-known in the art, a pneumatic rivetng gun includes a sliding hammer element 53 (FIG. 1) that is located within the inner end of the barrel 245. The pressurized air from the main pneumatic conduit 52 is distributed within the gun in a manner that forces the sliding hammer element 53 to repeatedly collide with the inner end 32 of the boss 30, thereby delivering a succession of impulsive forces to the boss 30. The impulsive forces are transmitted to the attached mandrel 14 to force the enlarged portion 38 of the mandrel through the hole 16. The mandrel 14 is moved through the hole in several increments, one occurring each time an impulsive force is delivered by the hammer element.

As noted, after the enolarged portion 38 of the mandrel is thrust through the hole, the elasticity of the metal causes the hole to contract to a diameter $d_{hc}$ that is greater than its original diameter $d_h$, but slightly smaller than the major diameter $d_3$ of the mandrel's enlarged portion 38. Because of this contraction, force is needed to pull the enlarged portion of the mandrel back through the hole. The tool formed in accordance with this invention is equipped to supply the force necessary to extract the mandrel. Specifically, the riveting gun body 21 and the barrel 24 are substantially enclosed within a rigid tubular housing 56. The housing has forward end 58 and an opposing rearward end 60. The body 21 of the gun 12 is positioned between these two ends with the barrel being adjacent to the forward end of the housing. An elongate longitudinal slot 59 is formed in the housing. The handle 22 of the gun protrudes through the slot 59.

A piston and cylinder assembly 18 is fastened to the rearward end 60 of the housing 56. More particularly, the cylinder 62 of the assembly has an annular extension piece 64 protruding from one end. The extension piece 64 fits within the rearward end of the tubular housing 56 and is fastened thereto by a number of threaded fasteners 66 that are spaced apart around the circumference of the housing. The piston and cylinder assembly includes a piston 68 housed within the cylinder 62. The piston 68 has an attached piston rod 70. The piston rod 70 projects from the end of the piston and cylinder assembly that is fastened to the housing. The longitudinal axis of the piston rod 70 is coaxial with the longitudinal axis of the mandrel 14. The outermost end of the rod 70 is threaded into the body 21 of the gun 12.

The housing 56 has a rigid, substantially tubular-shaped nose cap 72 fastened to its forward end 58. The nose cap 72 has a radially outwardly-flanged rearward end 74. The rearward end of the nose cap 72 fits within the forward end 58 of the housing 56 and is fastened thereto by threaded fasteners 76 that are spaced apart along the circumference of the housing and are threaded into the flange of the nose cap. The forwardmost end of the nose cap 72 extends beyond the boss 30 and retainer cap 36. A flat end wall 78 is formed in the forwardmost end of the cap. The end wall 78 is disposed in a plane substantially normal to the longitudinal axis of the mandrel 14. An aperture 80 is formed through the end wall 78 ad is positioned so that the mandrel passes therthrough.

A first hydraulic conduit 82 is connected to the cylinder 62 at a location such that when pressurized fluid is directed through the conduit 82 into the cylinder 62, a rearward force is applied to the piston 68 and, concurrrently, a forward force is applied to the cylinder. While both forward and rearward forces are created by the pressurized fluid, only rearward motion occurs because the housing 56 and nose cap 72 brace the cylinder 62 against the workpiece 20 preventing forward motion of the cylinder. That is, when the enlarged portion 38 of the mandrel 14 is extended through the hole 16, and the tool is held with the flat end wall 78 of the nose cap 72 against the metal workpiece 20, the hydraulically created forward motion of the cylinder 62 is prevented by the rigidity of the rigid housing 56 and attached nose cap 72. Since the cylinder is restrained from moving forward, only rearward piston movement can occur. Rearward movement of the piston 68 pulls the gun rearwardly, resulting in the enlarged portion 38 of the attached mandrel being pulled back through the hole. The forward movement of the piston 68 through the cylinder 62 that occurs when the tool is operated to push the mandrel through a hole forces hydraulic fluid from the cylinder back to a reservoir 92 (FIG. 3) described below.

Figure 3:
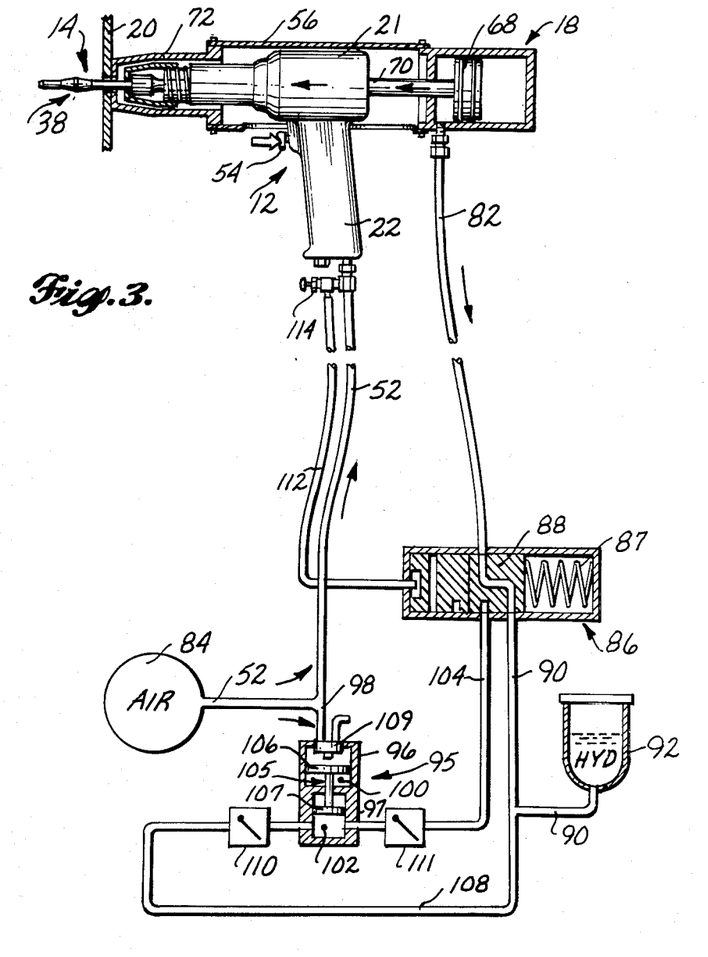
FIG. 3 is a diagram of the tool of FIG. 1, including the tool's operating system, showing the system's configuration as the mandrel is thrust through a hole; and, FIG. 4 is a diagram of the tool of FIG. 1, including the tool's operating system, showing the system's configuration as the mandrel is extracted from a hole.

A pneumatic and hydraulic system employed for operating the tool in the above-described manner are next described, with reference to FIGS. 1–4. FIG. 3 shows the various components of the system configured for operating the tool to thrust the mandrel forwardly. The system includes a source of pressurized air 84. The air source 84 is connected to the riveting gun 12 by the main pneumatic conduit 52. When the trigger 54 of the gun is pressed, the air supplied via pneumatic conduit 52 causes the sliding hammer element 53 to apply repetitive impulsive forces to the boss 30 which drive the attached mandrel 14 through the workpiece in the manner described above.

The flow of hydraulic fluid to and from the piston and cylinder assembly 18 through the first hydraulic conduit 82 is controlled by a two-position hydraulic control valve 86. The valve 86 has a movable internal valve element 88. The valve element 88 is normally biased by spring 87 into a first position as shown in FIG. 3. When in the first position, fluid communicAtion is provided between the first hydraulic conduit 82, which extends between the piston and cylinder assembly 18 and valve 86, and a second hydraulic conduit 90 that extends between the valve 86 and a hydraulic fluid reservoir 92. When the tool is operated to thrust the mandrel 14 through the hole in the metal workpiece 20, the valve element 88 of control valve 86 is in its first position. Thus, as the piston 68 moves forwardly in The cylinder 62, hydraulic fluid is directed through the first hydraulic conduit 82 and into the second hydraulic conduit 90. From the second hydraulic conduit 90, the fluid flows into both the reservoir 92 and a hydraulic supply conduit 108, which branches off the second hydraulic conduit 90 at a point between the reservoir 92 and valve 86. The supply conduit 108 is connected at its other end to a positive displacement pump 95, as described below.

Figure 4:
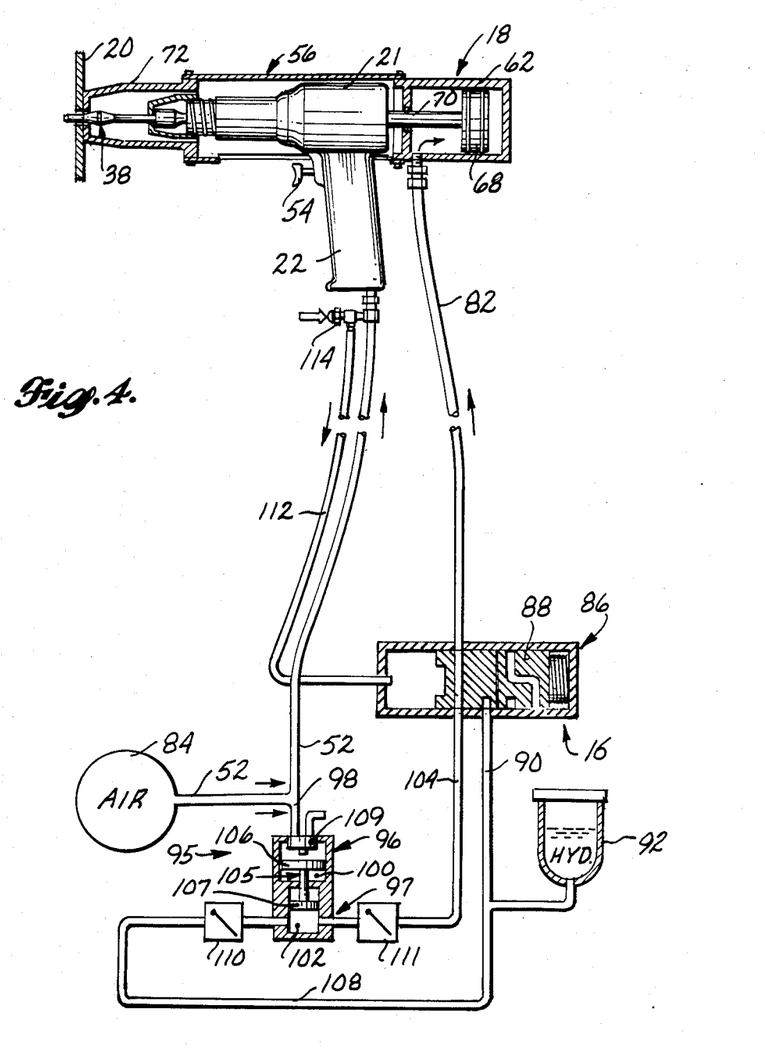

When the tool is operated to extract the mandrel 14 from the hole, pressurized hydraulic fluid is directed into the piston and cylinder assembly 18 through the first hydraulic conduit 82. With reference to FIG. 4, the hydraulic fluid is pressurized by a conventional positive displacement pump 95, such as manufactured by SC Hydraulic Engineering Corporation of Los Angeles, Calif., Model No. 10-400-50. The pump 95 has an input end 96 into which air from the pressurized air source 84 is directed via a branch pneumatic conduit 98. The pump also has an output end 97. A third hydraulic conduit 104 is connected between the output end 97 and the control valve 86. The pump 95 includes two separate cylinders: an input cylinder 100 formed in its input end 96, and an output cylinder 102 formed in its output end 97. The input cylinder 100 has a greater diameter than the output cylinder 102. A piston assembly 105 that comprises two rigidly connected pistons moves within the pump 95. One piston 106 of the assembly 105 is located in the input cylinder 100,t he other piston 107 is located in the output cylinder 102. As is known int he art, the pressure applied against the piston 106 in the larger input cylinder will be increased or "stepped up" in the fluid in the output cylinder that is acted upon by the smaller output piston 107.

The output cylinder 102 receives hydraulic fluid from the hydraulic supply conduit 108. The pump 95 pressurizes the fluid within the output cylinder 102 and forces the fluid into the third hydraulic conduit 104. More specifically, the pump 95 includes an internal pneumatic valve assembly 109 that directs the pressurized air from branch pneumatic conduit 98 in a manner that causes the piston assembly 105 to reciprocate within the pump 95. The piston assembly 105 alternates between downstrokes and upstrokes. During each downstroke, the piston assembly moves down to pressurize the fluid in the output cylinder 102 and third hydraulic conduit 104. During each upstroke, the piston assembly is moved up to create a partial vacuum in the output cylinder 102. The vacuum in the output cylinder draws hydraulic fluid from the hydraulic supply conduit 108. A conventional check valve 110 is connected in the hydrauic supply conduit 108 near where that conduit is connected to the pump 95. The check valve 110 is arranged so that fluid is prevented from passing back into the source hydraulic conduit 108 when the piston assembly 105 of the pump moves through its downstroke. Another check valve 111 is connected in the third pneumatic conduit 104 near where that conduit is connected to the pump. This check valve 111 is arranged so that fluid cannot be drawn from the third hydraulic conduit 104 when the piston assembly 105 moves through its upstroke.

The third hydraulic conduit 104 extends from the output cylinder of the pump 95 to the hydraulic control valve 86. There the third hydraulic conduit is dead-ended when the control valve element 88 is in its first position (FIG. 3). When the tool is operated to extract the mandrel, the control valve element 88 is moved into its second position (FIG. 4) whereby fluid communication is opened between the third hydraulic conduit 104 and the first hydraulic conduit 82 to supply the pressurized hydraulic fluid to the cylinder 62 of the piston and cylinder assembly 18.

In order to move the control valve element 88 into the second position, a pneumatic pilot conduit 112 is interconnected between the control valve 86 and the main pneumatic conduit 52. The pilot conduit 112 joins the main pneumatic conduit 52 at a point near the handle 22 of the gun 12. A trigger valve 114 is connected to the pilot conduit 112 where that conduit meets the main pneumatic conduit 52. The trigger valve 114 is opened when pressed by the user. When the trigger valve 114 is opened, pressurized air from the main pneumatic conduit 52 passses into the pilot conduit 112. The pressurized air passing through the pilot conduit is directed into one end of the hydraulic control valve 86 and axis upon the valve element 88 to overcome the biasing force of spring 87 and move the valve element into its second position.

After the mandrel is extracted from the hole, the trigger valve 114 is released. The trigger valve 114 includes an exhaust port that vents the pilot conduit 112 when the trigger valve is released. Therefore, when the trigger valve is released, the spring 87 in the control valve is no longer opposed by pressurized air from pilot conduit 112 and the valve element 88 is moved back to its first position.

With the preferred operating system of the tool as just described, the maximum pressure developed in the hydraulic components is significantly lower than would be necessary to extract the mandrel if the hole was not first partially enlarged by pneumatically forcing the mandrel through the hole. The advantage of a relatively low pressure hydraulic system is that the system can be configured with relatively compact lightweight components.

Whenever a mandrel is forced through a hole in a metal workpiece, a certain amount of metal will erupt in the form of an annular-shaped protrusion around the edge of the hole most often this protrusion must be removed either before or after the fastener is inserted into the hole. It has been found that when a hole is cold-worked with a tool formed in accordance with this invention, there is very little or no such protrusion. it is believed that the reduction or elimination of these protrusions is chiefly attributable to the incremental manner in which the mandrel is initially thrust through the hole. Specifically, it is believed that little or no protrusion occurs because the portion of the metal surrounding the hole that is strained in the longitudinal direction by the advancing mandrel has an opportunity to recover when the mandrel movement is halted between the successive impulses delivered by the riveting gun. This, the total longitudinal strain of the metal surrounding the hole is minimized or eliminated. Consequently, the annular protrusion that results from this longitudinal strain is likewise minimized or eliminated. It is also believed that since the mandrel is forcibly extracted from the hole, any metal protruding outside of the hole will be drawn rearwardly back into the hole as the mandrel is extracted.

While the present invention has been described in relation to a preferred embodiment, it is to be understood that various changes, substitutions of equivalents and other alterations can be made without departing from the spirit and scope of the invention.

The embodiments of the invention in which an exclusive property or privilege is claimed are defined as follows:

1. A cold-working tool for thrusting an attached mandrel partially through a hole in a metal workpiece and extracting the mandrel from the hole, comprising:
   (a) a gun having a body, handle portion, and a elongate barrel, the barrel having an outer end located away from the body of the gun;
   (b) a boss having an inner end and an outer end, the inner end of the boss being retained within the outer end of the barrel, the inner end of the boss being slidable within the barrel, the outer end of the boss having the mandrel attached thereto;

(c) penumatic means associated with the gun and operable for delivering a succession of impulsive forces to the inner end of the boss and attached mandrel, a portion of the mandrel being forced through the hole by the impulsive forces;

(d) a piston and cylinder assembly, the piston being slidable within the cylinder and having an attached rod extending from the cylinder with its outermost end attached to the gun, the piston and cylinder assembly and gun being configured and arranged so that when pressurized fluid is directed into the cylinder the piston is moved within the cylinder thereby creating a force tending to draw the gun and cylinder toward each other;

(e) a housing having a first end and a second end, the first end connected to the piston and cylinder assembly, the housing configured so that its second end projects outwardly beyond the boss, the second end of the housing being positionable against the metal workpiece to brace the piston and cylinder assembly against the metal workpeice with the gun substantially between the piston and cylinder assembly and the metal workpiece for preventing movement of the cylinder toward the gun when pressurized fluid is directed into the cylinder, the housing being further configured to substantially enclose the gun and permit movement of the gun within the housing; and, (f) operating means for selectively supplying pressurized fluid into the cylinder of the piston and cylinder assembly.

2. The tool of claim 1, wherein the pneumatic means includes:

(a) a source of pressurized air;

(b) a main pneumatic conduit interconnected between the source and the gun for conducting pressurized air to the gun;

(c) a sliding hammer element located within the gun, the pneumatic means being configured and arranged so that when pressurized air is directed into the gun the hammer element will be forced to repeatedly collide with the boss to deliver a succession of impulsive forces thereto; and, (d) a trigger connected to the main pneumatic conduit for controlling the flow of pressurized air to the gun.

3. The tool of claim 2, wherein the operating means includes:

(a) a source of pressurized hydraulic fluid;

(b) a hydraulic fluid reservoir;

(c) a valve operable between a first and a second position;

(d) a first hydraulic conduit connected to provide fluid communication between the cylinder of the piston and cylinder assembly and the valve;

(e) a second hydraulic conduit connected to provide fluid communication between the valve and the reservoir;

(f) a third hydraulic conduit connected to provide fluid communication between the source of pressurized hydraulic fluid and the valve; and, (g) valve operation means for moving the valve between the first position wherein the first and second hydraulic conduits are connected to provide fluid communication between the cylinder of the piston and cylinder assembly and the reservoir, and a second position wherein the first and third hydraulic conduits are connected to provide fluid communication between the source of pressurized hydraulic fluid and the cylinder of the piston and cylinder assembly.

4. The tool of claim 3 further comprising a pump for pressurizing the hydraulic fluid; and a pneumatic conduit connected between the main pneumatic conduit and the pump for delivering pressurized air to operate the pump.

5. The tool of claim 3, wherein the valve operation means includes biasing means connected to the valve for normally maintaining the valve in the first position, the valve operation means also including a pilot pneumatic conduit interconnected between the main pneumatic conduit and the valve, the pilot pneumatic conduit having a trigger valve for selectively opening and closing the pilot pneumatic conduit wherien opening of the pilot pneumatic conduit supplies pressurized air to the valve to overcome the biasing means and move the valve to the second position.

6. The tool of claim 1, wherein the operating means includes:

(a) a source of pressurized hydraulic fluid;

(b) a hydraulic fluid reseervoir;

(c) a valve operable between a first and a second position;

(d) a first hydralic conduit connected to provide fluid communication between the cylinder of the piston and cylinder assembly and the valve;

(e) a second hydralic conduit connected to provide fluid communication between the valve and the reservoir;

(f) a third hydralic conduit connected to provide fluid communication between the source of pressurized hydralic fluid and the valve; and, (g) valve operation means for moving the valve between the first position wheriin the first and second hydaulic conduits are connected to provide fluid communication between the cylinder of the piston and cylinder assembly and the reservoir, and a second position wherein the first and third hydraulic conduits are connected to provide fluid communication between the source of pressurized hydraulic fluid and the cylinder of the piston and cylinder assembly.

7. The tool of claim 6, wherein the pneumatic means includes:

(a) a source of pressurized air;

(b) a main pneumatic conduit interconnected between the source and the gun for conducting pressurized air to the gun;

(c) a sliding hammer element located within the gun, the pneumatic means being configured and arranged so that when pressurized air is directed into the gun the hammer element will be forced ro repeatedly collide with the boss to deliver a succession of impulsive forces thereto; and, (d) a trigger connected to the pneumatic conduit for controlling the flow of pressurized air through the conduit.

8. The tool of claim 7, wherein the valve operation means includes biasing means connected to the valve for normally maintaing the valve in the first position, the valve operation means also including a pilot pneumatic conduit interconnected between the main pneumatic conduit and the valve, the pilot pneumatic conduit having a trigger valve for selectively opening and closing the pilot pneumatic conduit wherein opening of the pilot pneumatic conduit supplies pressurized air to the valve to overcome the biasing means and move the valve to the second position.

9. A cold-working tool comprising:
(a) a portable pneumatic riveting machine having an outer end, the machine being operable to deliver impulsive forces through the outer end;
(b) a mandrel fixed to the outer end of the riveting machine;
(c) a substantially rigid housing substantially enclosing the riveting machine, the mandrel partially protruding from the housing, said housing being configured to permit movement of the riveting machine within the housing;
(d) a piston and cylinder assembly, the piston being slidable within the cylinder and having an attached rod extending from the cylinder with its outermost end attached to the riveting machine, the piston and cylinder assembly and riveting machine being configured and arranged so that when pressurized fluid is directed into the cylinder the piston is moved within the cylinder thereby creating a force tending to draw the rivering machine and cylinder toward each other; and,
(e) operating means for selectively supplying pressurized fluid into the cylinder of the piston and cylinder assembly.

10. The tool of claim 9, wherein the operating means incluses:
(a) a source of pressurized hydraulic fluid;
(b) a hydraulic fluid reservoir;
(c) a valve operable between a first and a second position;
(d) a first hydraulic conduit connected to provide fluid communication between the cylinder of the piston and cylinder assembly and the valve;
(e) a second hydraulic conduit connected to provide fluid communication between the valve and the reservoir;
(f) a third hydraulic conduit connected to provide fluid communication between the source of pressurized hydraulic fluid and the valve; and,
(g) valve operation means for moving the valve between the first position wherien the first and second hydraulic conduits are connected to provide fluid communication between the cylinder of the piston and cylinder assembly and the reservoir, and a second position wherein the first and third hydraulic conduits are connected to provide fluid communication between the source of pressurized hydraulic fluid and the cylinder of the piston and cylinder assembly.

* * * * *

UNITED STATES PATENT AND TRADEMARK OFFICE
CERTIFICATE OF CORRECTION

PATENT NO. : 4,715,203

DATED : December 29, 1987

INVENTOR(S) : John H. Wiegenstein

It is certified that error appears in the above-identified patent and that said Letters Patent is hereby corrected as shown below:

Abstract, line 5, "barret" should be --barrel--.

Abstract, line 28, "extarct" should be --extract--.

Column 4, line 19, "2" should be --12--.

Column 4, line 50, "$d^1$" should be --$d_1$--.

Column 5, line 12, "245" should be --24--.

Column 8, line 5, "axis" should be --acts--.

Column 8, line 29, insert --.-- (period) after "hole".

Column 8, line 29, "most" should be --Most--.

Column 8, line 43, "This" should be --Thus--.

Column 8, line 62, "a" (third occurrance) should be --an--.

Column 9, line 23, "workpeice" should be --workpiece--.

Column 10, line 25, "reseervoir" should be --reservoir--.

Column 10, line 28, "hydralic" should be --hydraulic--.

Column 10, line 31, "hydralic" should be --hydraulic--.

Column 10, line 34, "hydralic" should be --hydraulic--.

Column 10, line 36, "hydralic" should be --hydraulic--.

UNITED STATES PATENT AND TRADEMARK OFFICE
CERTIFICATE OF CORRECTION

PATENT NO. : 4,715,203

DATED : December 29, 1987

INVENTOR(S) : John H. Wiegenstein

It is certified that error appears in the above-identified patent and that said Letters Patent is hereby corrected as shown below:

```
Column 10, line 38, "wheriin" should be --wherein--.

Column 10, line 39, "hydaulic" should be --hydraulic--.

Column 10, line 56, "ro" should be --to--.

Column 10, line 64, "maintaing" should be --maintaining--.

Column 11, line 24, "rivering" should be --riveting--.

Column 12, line 5, "incluses" should be --includes--.

Column 12, line 20, "wherien" should be --wherein--.
```

Signed and Sealed this

Sixteenth Day of August, 1988

Attest:

DONALD J. QUIGG

*Attesting Officer*         Commissioner of Patents and Trademarks